(12) United States Patent
Wu et al.

(10) Patent No.: US 8,941,323 B1
(45) Date of Patent: Jan. 27, 2015

(54) CEILING LAMP ADOPTING NON-SEPARATING DRIVER CIRCUIT

(71) Applicant: Unity Opto Technology Co., Ltd., New Taipei (TW)

(72) Inventors: Chih-Hsien Wu, New Taipei (TW); Wei Chang, New Taipei (TW); Kai-Cheng Chuang, New Taipei (TW); Shao-Wei Chiu, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/026,132

(22) Filed: Sep. 13, 2013

(30) Foreign Application Priority Data

Jul. 5, 2013 (TW) .............................. 102212752 U

(51) Int. Cl.
*H05B 37/02* (2006.01)
*H05B 33/08* (2006.01)

(52) U.S. Cl.
CPC ........ *H05B 33/0812* (2013.01); *H05B 33/0845* (2013.01); *H05B 33/089* (2013.01)
USPC ........ 315/291; 315/127; 315/192; 315/209 R; 315/247; 315/307

(58) Field of Classification Search
USPC .......... 315/127, 185 R, 192, 209 R, 247, 291, 315/294, 307, 308
See application file for complete search history.

(56) References Cited

U.S. PATENT DOCUMENTS

| 7,358,679 | B2 * | 4/2008 | Lys et al. | 315/51 |
| 8,253,342 | B2 * | 8/2012 | Ku et al. | 315/186 |
| 8,508,150 | B2 * | 8/2013 | Kuo et al. | 315/291 |
| 2009/0195186 | A1 * | 8/2009 | Guest et al. | 315/294 |

* cited by examiner

*Primary Examiner* — Douglas W Owens
*Assistant Examiner* — Thai Pham
(74) *Attorney, Agent, or Firm* — Rosenberg, Klein & Lee

(57) ABSTRACT

A ceiling lamp adopting a non-separating driver circuit includes a conversion module and a control module. The conversion module converts an input voltage into an operating voltage to drive the LEDs and forming a driving current, and the control module monitors the operating voltage and the driving current to adjust the operating cycle of the conversion module, change the output voltage value of the operating voltage, and linearly change the driving current at a constant current state. The conversion module just executes the power conversion for one time to provide the driving power of the LEDs instead of using the conventional driving method that executes a two-stage power conversion by a separating power converter and a negative booster of the conventional ceiling lamp. Therefore, the ceiling lamp adopting a non-separating driver circuit is capable of lowering the circuit cost and improving the operating efficiency.

5 Claims, 6 Drawing Sheets

CEILING LAMP ADOPTING NON-SEPARATING DRIVER CIRCUIT

CROSS-REFERENCE TO RELATED APPLICATIONS

This non-provisional application claims priority under 35 U.S.C. §119(a) on Patent Application No(s). 102212752 filed in Taiwan, R.O.C. on Jul. 5, 2013, the entire contents of which are hereby incorporated by reference.

BACKGROUND OF THE INVENTION

1. Field of the Invention

The present invention relates to the field of illumination equipments, and more particularly to a ceiling lamp adopting a non-separating driver circuit, and a non-separating power converter is operated having a linear constant current output controller to improve the overall operating efficiency of the lamp and complies with the energy saving and environmental protection requirements.

2. Description of the Related Art

To create a comfortable, bright and stylish reading space or working space, fashionable ceiling lamps are generally installed to the ceiling as shown in FIG. 1, and the ceiling lamp 1 generally comprises a lamp disc 10, a heat dissipating plate 11, a lamp panel 12, a reflecting cover 13 and a lamp cover 14, and the lamp disc 10 is provided for installing and stacking the heat dissipating plate 11 and the lamp panel 12, and the lamp panel 12 has a driver circuit (not shown in the figure) and a plurality of light emitting diodes (LEDs) 120 installed around the periphery of the lamp panel 12 as shown in FIGS. 2 to 4, and the driver circuit adopts a switching power converter as the main circuit architecture and the switching power converter is generally a fly-back, forward, push-pull, half-bridge or full-bridge circuit. The reflecting cover 13 is covered onto the middle position of the lamp panel 12 and sealed into the lamp cover 14, so that the reflecting cover 13 can enhance the effect of diffusing the light source emitted from the LEDs to expand the illumination range of the ceiling lamp 1. In FIG. 2, the driver circuit adopts the fly-back converter 121 as the main power structure, and a pulse width modulation (PWM) control method is used to adjust the power intensity of an operating current (Io) outputted to the LEDs 120 to allow the ceiling lamp 1 to operate at a constant current and a constant power, so as to provide a stable illumination quality to users. However, such conventional fly-back converter 121 outputs an operating current with the drawbacks of a relatively larger ripple waves, a relatively lower precision of load adjustment, and relatively more strobes produced by a PWM dimming and a relatively greater electromagnetic interference (EMI), so that it is necessary to install an EMI filter additionally to avoid contaminating the power source of the utility power or affecting the using quality of the remaining electronic products, and thus resulting in a higher manufacturing cost of the lamp panel 12.

In addition, the driver circuit can adopt a power factor (PF) correction single-stage fly-back converter 122 as the main power source structure as shown in FIG. 3, and then a negative booster 123 is installed at an output terminal. The single-stage fly-back converter 122 has a transformer 1220 with a primary side coil (NP), a secondary side coil (NS) and an auxiliary coil (NA), and the primary side coil is electrically coupled to a bridge rectifier 1221, and the primary side coil and the auxiliary coil are electrically coupled to a power factor control IC (FPC IC) 1222. The secondary side coil is electrically coupled to the LEDs 120 through an output inductor 1230, and the secondary side coil and the output inductor 1230 are electrically coupled to a DC/DC IC 1223, and the output inductor 1230 is electrically coupled to the FPC IC 1222 through a photocoupler 1224. The single-stage fly-back converter 122 uses the transformer 1220 to convert an input voltage rectified and outputted by the bridge rectifier 1221, and then the output inductor 1230 steps down the voltage to produce an operating voltage required by the LEDs 120. In the meantime, the single-stage fly-back converter 122 uses the photocoupler 1224, the DC/DC IC 1223 and the FPC IC 1222 to monitor the output voltage value of the operating voltage, so as to control the operating cycle of the primary side coil that affects the voltage value outputted by the secondary side coil, and ensure the effect of outputting the operating voltage stably. Since the main circuit architecture of this driver circuit integrates the power factor correction function and the DC/DC control function without requiring the installation of other control devices, so as to achieve the effect of lowering the cost. However, after the input voltage has a first-time energy conversion through the transformer 1220, it is necessary to have the output inductor 1230 to perform a second-stage conversion before the required operating voltage can be outputted, so that more ripples are produced when the energy conversion efficiency is low and the value of the outputted operating voltage is small.

In FIG. 4, the driver circuit comprises a PFC double-stage fly-back converter 124 and a negative booster 125, wherein a front stage and a back stage are defined between a primary side coil and a secondary side coil of a transformer 1240, and the front stage includes an input inductor 1241 and a FPC IC 1242, wherein the FPC IC 1242 is provided for checking an input current and an output voltage of the front stage before switching a first switch 1243 ON or OFF to regulate the conduction cycle of the input inductor 1241 to change the intensity of a current generated by the primary side coil, so as to affect the intensity of a current outputted from the secondary side coil. In addition, the back stage includes a DC/DC IC 1244 for checking the intensity of a current outputted by the secondary side coil to change the state of the second switch 1245 to regulate the conduction cycle of an output inductor 1250, so as to eliminate the ripple amplitude of the outputted operating voltage. Therefore, the driver circuit can provide a ripple-free operating voltage with a very high stability to improve the illumination quality of the ceiling lamp 1. However, after the input voltage is boosted by the input inductor 1241, the voltage is converted by the transformer 1240 and then stepped down and outputted by the output inductor 1250. In other words, the input voltage is processed through a three-stage conversion before the required operating voltage can be obtained, and thus resulting in a high power loss and low power conversion efficiency, and incurring a high cost for a complicated circuit architecture. Obviously, the conventional ceiling lamp is not conductive to industrial development and applications.

In view of the aforementioned problems, it is a main subject of the present invention to improve the circuit architecture of the driver circuit by providing a very stable operating voltage to the LEDs 120, while improving the conversion efficiency and simplifying the complexity of the driver circuit to lower the cost.

SUMMARY OF THE INVENTION

Therefore, it is a primary objective of the present invention to provide a ceiling lamp adopting a non-separating driver circuit, a simple non-separating power conversion circuit is used as main architecture of the driver circuit to achieve the effects of lowering the component cost, improving the overall cost-effectiveness of the lamp, and contributing to the industrial development.

To achieve the aforementioned objectives, the present invention provides a ceiling lamp adopting a non-separating driver circuit, and the ceiling lamp comprises: a lamp panel, having a plurality of light emitting diodes (LEDs) installed thereon, and a driver circuit, provided for driving and linearly adjusting the illumination brightness of the LEDs and comprised of a rectification module, a conversion module and a control module, and the conversion module being electrically coupled to an external power supply through the rectification module for receiving an input voltage, and the control module being electrically coupled to the conversion module and the LEDs, and having a control IC, a sense resistor, a compare resistor and a regulator, and the sense resistor, the compare resistor and the regulator being electrically coupled to the LEDs, characterized in that the conversion module comprises a power conversion element, a conversion switch and a detection resistor, and the power conversion element being electrically coupled to the rectification module, and electrically coupled to the LEDs through the conversion switch, and electrically coupled to the control module through the detection resistor, and receiving and adjusting the input voltage to an operating voltage when the power conversion element turns off the conversion switch, such that the LEDs receive the operating voltage to form a driving current, and the control IC checking the operating voltage and stepping down the voltage at both terminals of the detection resistor, and the voltage drop formed at both terminals of the compare resistor by the driving current resulting in an output of a setting signal when the voltage drop formed at both terminals of the detection resistor is smaller than a predetermined value, and outputting an initialization signal to the conversion switch when the voltage drop at both terminals of the compare resistor is greater than a compare value, so as to selectively turns on or off the conversion switch to regulate a total output power of the operating voltage.

Wherein, the control IC checks the voltage drop of the operating voltage formed at both terminals of the sense resistor, and outputting a regulating signal to the regulator when the voltage drop formed at both terminals of the sense resistor is greater than a standard value to regulate the output frequency of the operating voltage to maintain the driving current at a constant status. The control module includes a brightness controller for receiving an external dimming signal to regulate the operating status of the regulator to change the output voltage value of the operating voltage and affect the intensity of the driving current, so as to achieve a linear dimming effect. The power conversion element is a single-ended primary inductance converter (SEPIC) or a boost inductance converter. Since the driver circuit directly outputs the boosted operating voltage to the LEDs without stepping down the voltage, therefore it is necessary to prevent users to touch the high-voltage lamp panel by accident while disassembling the ceiling lamp, and an insulating protective cover is installed to the ceiling lamp to overcome the aforementioned problem. In other words, the ceiling lamp further comprises a lamp cover, a heat dissipating plate, the lamp panel, the insulating protective cover and a chassis, and the chassis is provided for installing and stacking the heat dissipating plate and the lamp panel sequentially, and the lamp panel is covered by the insulating protective cover and then sealed into the lamp cover.

In summation, the present invention adopts a reverse way of thinking to apply a conventional non-separating power converter circuit to the ceiling lamp, so that the power supply can supply power to the LEDs directly through a one-time power conversion, so as to achieve the effects of avoiding the problems of converting the power of the input voltage for two or three times by the driver circuits as shown in FIGS. 3 and 4, reducing power loss, and improving power conversion efficiency as shown in Table 1. In actual measurements, the overall working efficiency of both driver circuits of the ceiling lamps as shown in FIGS. 3 and 4 is equal to 79.12%, and the overall working efficiency of the driver circuit of the present invention is up to 86%, and thus showing that the present invention adopting a direct conversion of the input voltage for the output without using the circuit architecture of stepping down the voltage for the output can reduce the power loss effectively. In addition, the circuit architecture of the double-stage fly-back converter 124 is more complicated than that of the single-stage fly-back converter 122, so that the circuit cost of the driver circuit as shown in FIG. 4 is higher than that of the driver circuit as shown in FIG. 3. Compared with the conventional the negative boosters 123, 125 that may require an additional control card, the circuit architecture of the present invention is obviously simpler and cheaper than those of the driver circuits as shown in FIGS. 3 and 4. Therefore, the present invention an improve the cost-effectiveness of the ceiling lamp based on the aforementioned low cost and high efficiency, even thought the conventional circuit architecture is used for the driver circuit of the present invention.

TABLE 1

| Driver Circuit | Main Power Supply Architecture | Output Terminal | Overall Efficiency of Lamp | No. of Power Conversion | Power Loss | Cost of Circuit |
|---|---|---|---|---|---|---|
| As shown in FIG. 4 | Double-stage Fly-back Converter | Negative booster | 79.12% | 3 times | Highest | Highest |
| As shown in FIG. 3 | Single-stage Fly-back Converter | Negative booster | 79.12% | 2 times | Middle | Middle |
| Present Invention | Inductance Converter | None | 86% | 1 time | Lowest | Lowest |

DETAILED DESCRIPTION OF THE PREFERRED EMBODIMENTS

The technical content of the present invention will become apparent with the detailed description of preferred embodiments and the illustration of related drawings as follows.

Figure 1:
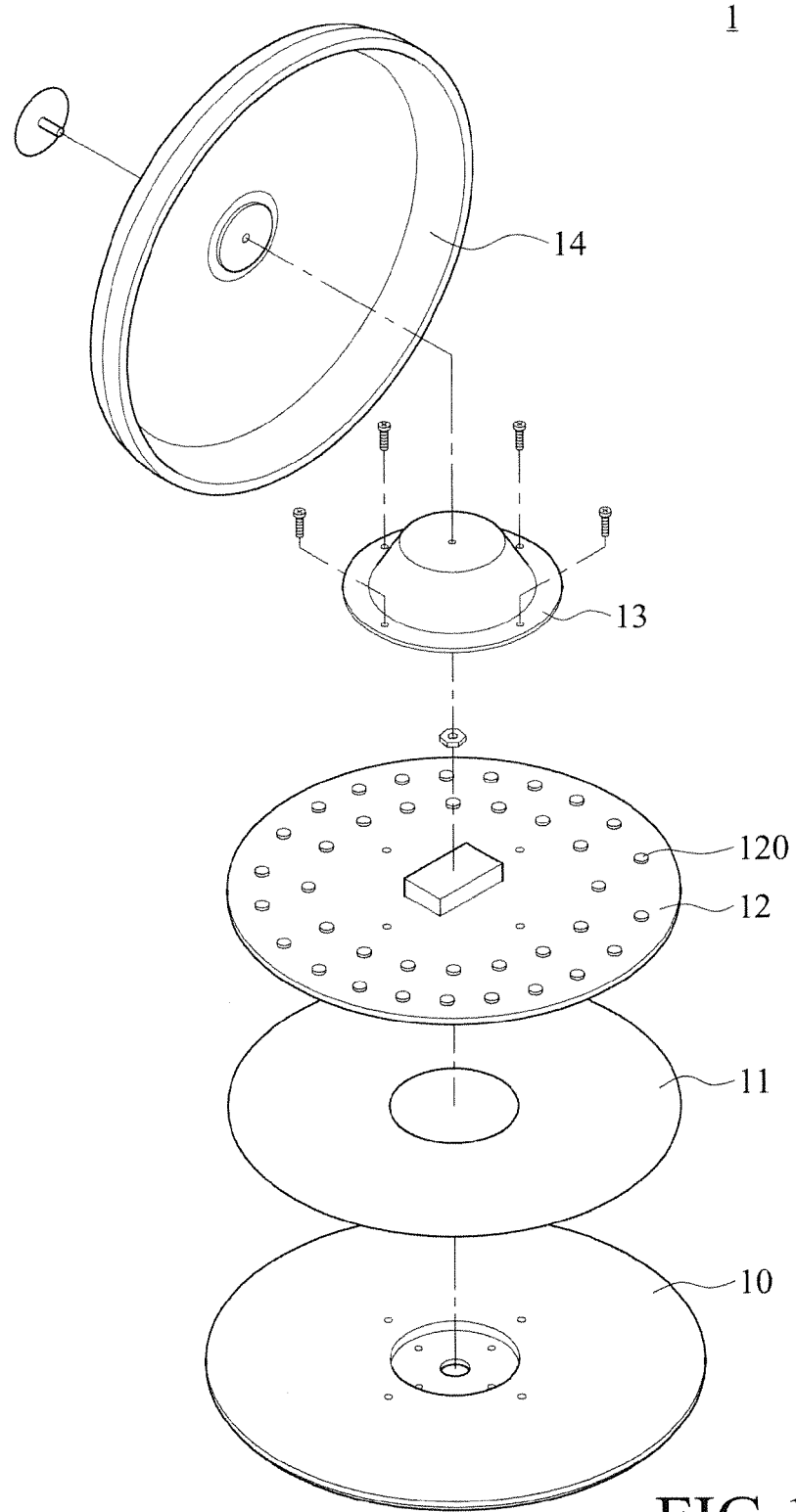
FIG. 1 is an exploded view of a conventional ceiling lamp.
Figure 2:
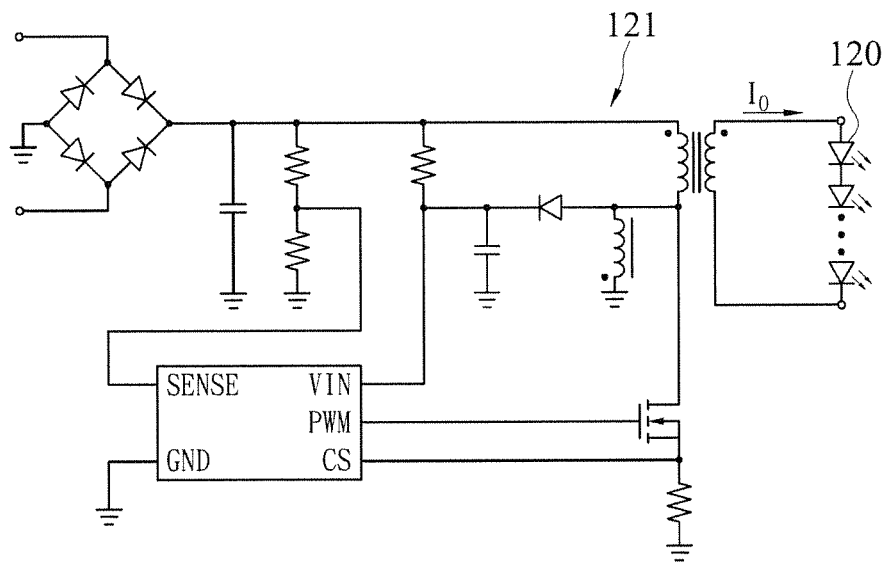
FIG. 2 is a circuit diagram of a first driver circuit of a conventional ceiling lamp.
Figure 3:
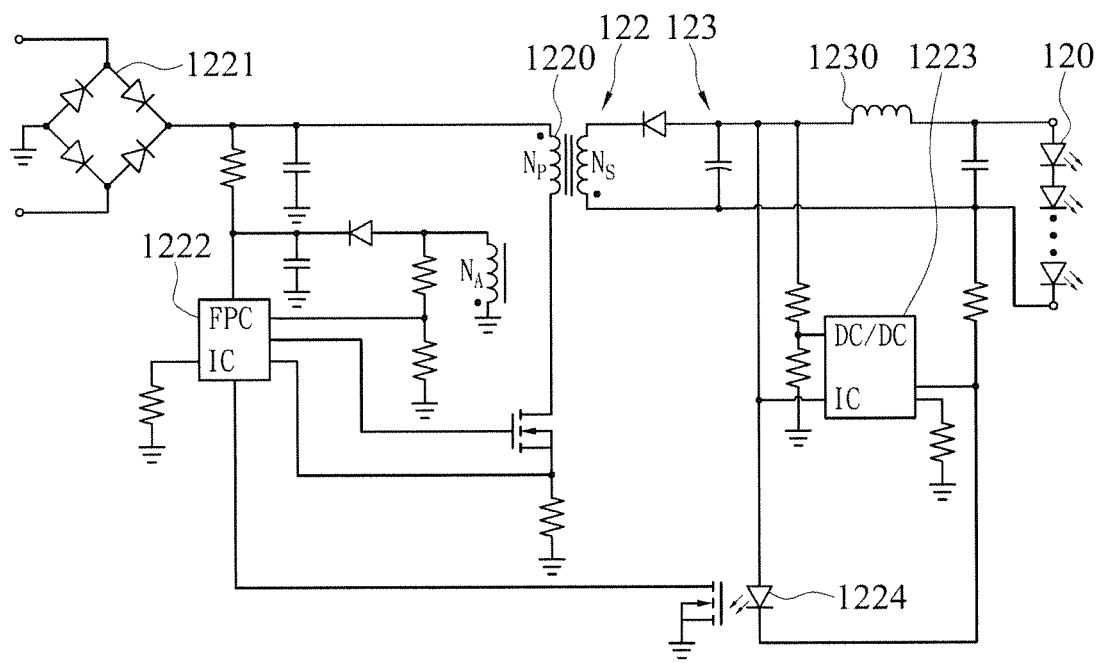
FIG. 3 is a circuit diagram of a second driver circuit of a conventional ceiling lamp.
Figure 4:
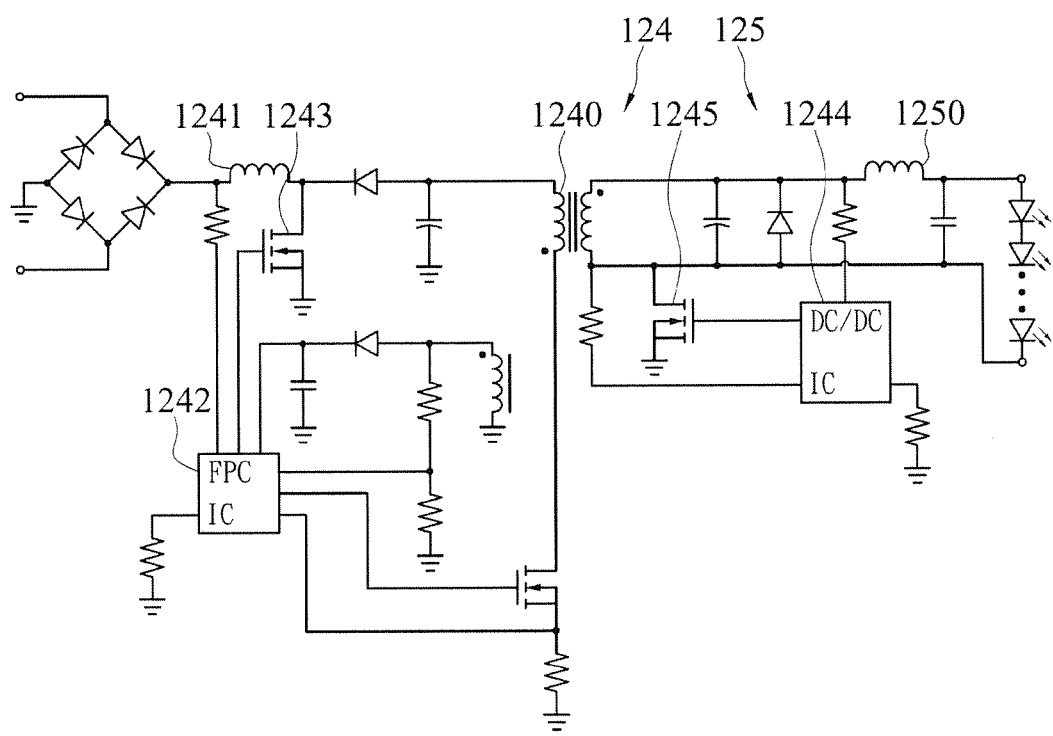
FIG. 4 is a circuit diagram of a third first driver circuit of a conventional ceiling lamp.
Figure 5:
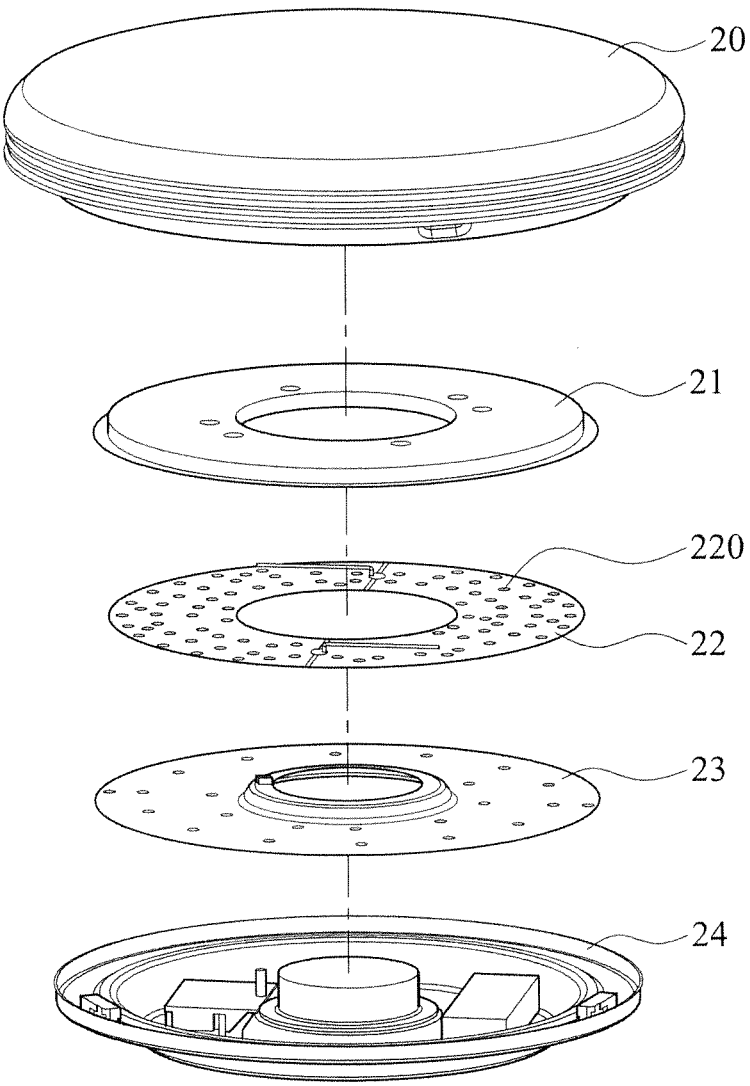
FIG. 5 is an exploded view of a preferred embodiment of the present invention.
Figure 6:
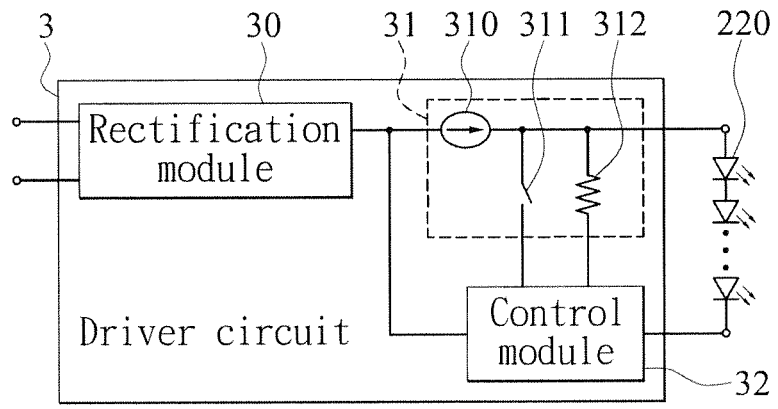
FIG. 6 is a block diagram of a preferred embodiment of the present invention.
Figure 7:
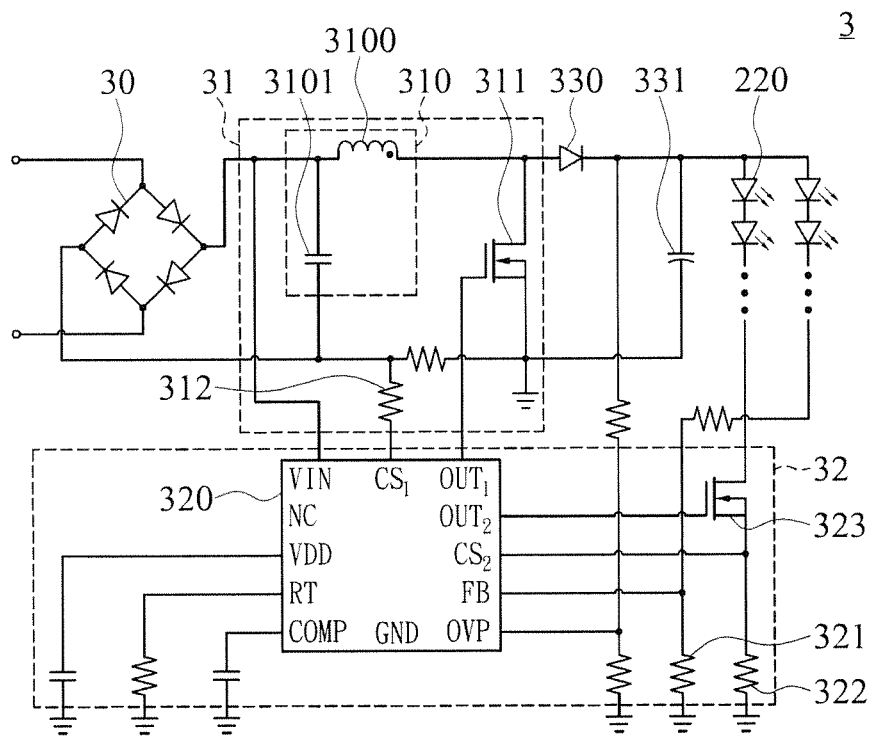
FIG. 7 is a circuit diagram of a preferred embodiment of the present invention.

With reference to FIGS. 5 to 7 for an exploded view, a block diagram and a circuit diagram of a ceiling lamp adopting a non-separating driver circuit in accordance with a preferred embodiment of the present invention respectively, the ceiling lamp 2 comprises a lamp cover 20, an insulating protective cover 21, a lamp panel 22, a heat dissipating plate 23 and a chassis 24, and the chassis 24 is provided for sequentially installing and stacking the heat dissipating plate 23 and the lamp panel 22. The lamp panel 22 includes a plurality of LEDs 220 and a driver circuit 3, and the lamp panel 22 is covered by the insulating protective cover 21 and sealed in the lamp cover 20, and the LEDs 220 are LED strings with two LEDs connected in parallel with each other. The driver circuit 3 is provided for driving and linearly adjusting the illumination brightness of the LEDs 220 and comprised of a rectification module 30, a conversion module 31 and a control module 32. The rectification module 30 is a full-wave bridge rectifier coupled to an external power supply (not shown in the figure) for receiving and rectifying an AC voltage of the power supply to form an input voltage. The control module 32 includes a control IC 320, a sense resistor 321, a compare resistor 322, and a regulator 323, wherein the regulator 323 is an N-Type Metal Oxide Semiconductor Field Effect Transistor (N-MOSFET) with its drain coupled to the LEDs 220 and the compare resistor 322 and its source coupled to the sense resistor 321. The control IC 320 has six pins such as VIN, NC, VDD, RT, COMP, GND, OVP, FB, $CS_1$, $CS_2$, $OUT_1$ and $OUT_2$, and is coupled to an output terminal of the full-wave bridge rectifier through the VIN pin and coupled to the source of the regulator 323 through $CS_2$, coupled to the gate of the regulator 323 through the $OUT_2$ pin, and coupled to the compare resistor 322 through the FB pin.

The conversion module 31 includes a power conversion element 310, a conversion switch 311 and a detection resistor 312, wherein the power conversion element 310 is a single-ended primary inductance converter or a boost inductance converter and includes a conversion inductor 3100 and a conversion capacitor 3101, and the conversion switch 311 is an N-MOSFET. A terminal of the conversion inductor 3100 is coupled to the conversion capacitor 3101 and an output terminal of the full-wave bridge rectifier. The other terminal of the conversion inductor 3100 is coupled to a drain of the conversion switch 311, and electrically coupled to the LEDs 220, and the $CS_1$ pin of the control IC 320 through the detection resistor 312. And the gate of the conversion switch 311 is coupled to the $OUT_1$ pin of the control IC 320. When the conversion switch 311 is turned off, the power conversion element 310 receives and regulates the input voltage to form an operating voltage and then outputs the operating voltage to the LEDs 220 directly, and the LEDs 220 receive the operating voltage to form a driving current. The control IC 320 checks a voltage drop of the operating voltage formed at both terminals of the detection resistor 312, so that when the voltage drop formed at both terminals of the detection resistor 312 is smaller than a predetermined value, a setting signal is outputted to the conversion switch 311 to turns off the conversion switch 311 and allow the conversion inductor 3100 to carry out the power conversion and output the operating voltage. In the meantime, the control IC 320 checks a voltage drop of the driving current formed at both terminals of the compare resistor 322, so that when the voltage drop formed at both terminals of the compare resistor 322 is greater than a compare value, an initialization signal is outputted to the conversion switch 311 to turn on the conversion switch 311; and the conversion inductor 3100 stops outputting the operating voltage for a short time to adjust the total power received by the LEDs 220. In addition, the control IC 320 also checks a voltage drop of the operating voltage formed at both terminals of the sense resistor 321, and when the voltage drop formed at both terminals of the sense resistor 321 is greater than a standard value, a regulating signal is outputted to the regulator 323 to regulate the output frequency of the operating voltage to maintain the driving current at a constant status, so as to achieve the driving mode with constant current and constant power.

Figure 8:
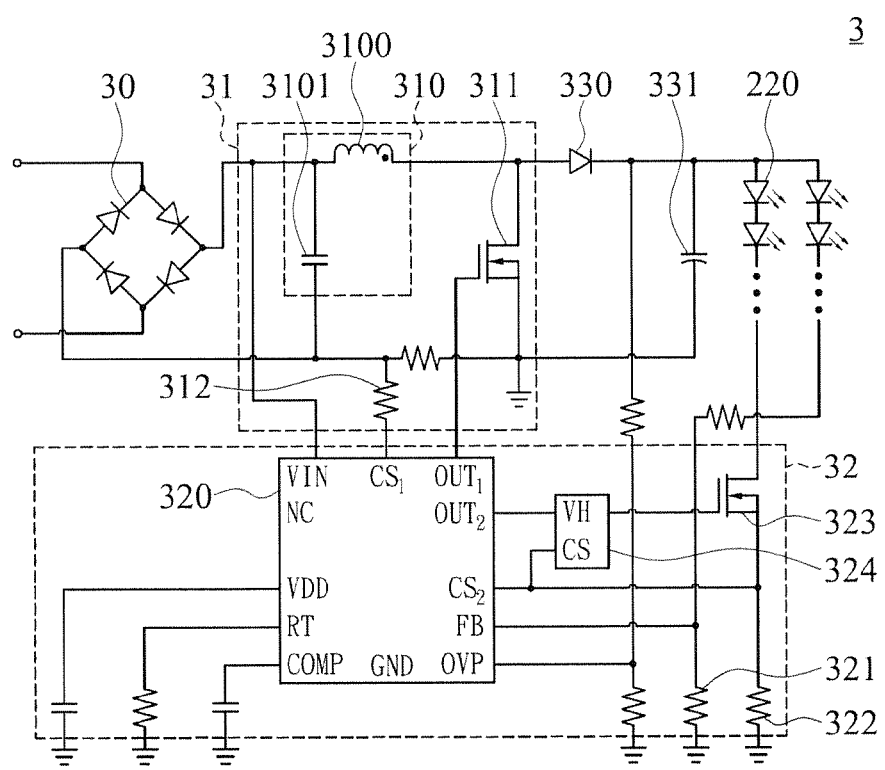
FIG. 8 is another circuit diagram of a preferred embodiment of the present invention.

In FIG. 8, the control module 32 includes a brightness controller 324 coupled to the $OUT_2$ pin of the control IC 320, the compare resistor 322 and a gate of the regulator 323 for receiving an external dimming signal and then regulating the original signal of the control IC 320 outputted from the $OUT_2$ pin, so as to regulate the working status of the regulator 323 according to the dimming signal to change of the output voltage value of the operating voltage. As such, the intensity of the driving current can be affected; and linear dimming can be achieved. It is noteworthy that the driver circuit 3 can add a filter diode 330 and a filter capacitor 331 between the conversion module 31 and the LEDs 220, and anode of the filter diode 330 is coupled to the conversion inductor 3100 and the cathode of the filter diode 330 is coupled to the LEDs 220 and the filter capacitor 331, and the filter capacitor 331 is connected in series with the detection resistor 312. Therefore, the driver circuit 3 can use the filter diode 330 to filter the operating voltage, and then make use of the charging/discharging effects of the filter capacitor 331 to improve the wave smoothness and stability of the operating voltage.

In this preferred embodiment, when the input voltage is $220V_{rms}$, the actual measured operating voltage is 108V, and the driving current of each LED string is 275 mA. Now, the driving current has 18% THD, and the driver circuit 3 has a power conversion efficiency of 86% and a PF 0.966. Since the outputted operating voltage is converted and regulated by the conversion module 31 without going through a second-stage power conversion, therefore there is no power loss issue, and the measured overall working efficiency of the ceiling lamp 2 is also equal to 86%.

What is claimed is:

1. A ceiling lamp adopting a non-separating driver circuit, and the ceiling lamp comprising: a lamp panel, having a plurality of light emitting diodes (LEDs) and a driver circuit installed thereon, the driver circuit being provided for driving and linearly adjusting the illumination brightness of the LEDs and comprised of a rectification module, a conversion module and a control module, and the conversion module being electrically coupled to an external power supply through the rectification module and receiving an input voltage, and the control module being electrically coupled to the conversion module and the LEDs, and having a control IC, a sense resistor, a compare resistor and a regulator, and the sense resistor, the compare resistor and the regulator being electrically coupled to the LEDs, characterized in that the conversion module is consist of a power conversion element, a conversion switch and a detection resistor, the power conversion element is electrically coupled to the rectification module, and electrically coupled to the LEDs through the conversion switch, and electrically coupled to the control module through the detection resistor, the power conversion element receives and adjusts the input voltage to an operating voltage when the conversion switch is turned off, such that the LEDs receive the operating voltage to form a driving current, and the control IC respectively checks voltage drop of the operating voltage at both terminals of the detection resistor and the voltage drop of the driving current formed at both terminals of the compare resistor, such that a setting signal is outputted when the voltage drop formed at both terminals of the detection resistor is smaller than a predetermined value, and an initialization signal is outputted to the conversion switch when the voltage drop at both terminals of the compare resistor is greater than a compare value, so as to selectively turns on or off the conversion switch to regulate a total output power of the operating voltage.

2. The ceiling lamp adopting a non-separating driver circuit according to claim 1, wherein the control IC checks the voltage drop of the operating voltage formed at both terminals of the sense resistor, and outputs a regulating signal to the regulator when the voltage drop formed at both terminals of the sense resistor is greater than a standard value to regulate the output frequency of the operating voltage to maintain the driving current at a constant status.

3. The ceiling lamp adopting a non-separating driver circuit according to claim 2, wherein the control module includes a brightness controller for receiving an external dimming signal to regulate the operating status of the regulator to change the output voltage value of the operating voltage and affect the intensity of the driving current, so as to achieve linear dimming.

4. The ceiling lamp adopting a non-separating driver circuit according to claim 3, wherein the power conversion element is a single-ended primary inductance converter or a boost inductance converter.

5. The ceiling lamp adopting a non-separating driver circuit according to claim 4, further comprising a lamp cover, an insulating protective cover, a heat dissipating plate and a chassis, and the chassis being provided for installing and stacking the heat dissipating plate and the lamp panel sequentially, and the lamp panel being covered by the insulating protective cover and then sealed into the lamp cover.

* * * * *